A
United States Patent [19]

Rikli

[11] 3,747,422

[45] July 24, 1973

[54] COMPENSATING LINKAGE

[76] Inventor: Eldon L. Rikli, R. R. 2, Waukomis, Okla. 73773

[22] Filed: Feb. 19, 1971

[21] Appl. No.: 117,040

Related U.S. Application Data

[62] Division of Ser. No. 815,989, March 16, 1971, Pat. No. 3,570,605.

[52] U.S. Cl. .................................................. 74/99
[51] Int. Cl. ............................................. F16h 21/44
[58] Field of Search ....................... 74/99, 101, 102, 74/106, 104, 89; 172/580

[56] References Cited
UNITED STATES PATENTS
2,512,380    6/1950    Quartullo ............................. 74/104

Primary Examiner—Milton Kaufman
Attorney—Dunlap, Laney, Hessin & Dougherty

[57] ABSTRACT

The present invention envisions apparatus for rotating a pair of aligned shafts in equal arcs while allowing relative rotary motion of the shafts. In one embodiment, apparatus embodying the invention may comprise elongated linking means which has positioned on each end thereof a universal joint. An arm may be rigidly secured to each of the aligned rotary shafts and each of the arms thus secured may be operatively connected to one of the universal joints located at the end of the elongated linking means. A power assembly may be provided for moving the linking means in an arc about the parallel shafts thereby rotating the shafts. The power assembly is characterized by means for connecting a portion thereof with a central portion of the linking means in such a manner as to allow pivotal motion of the linking means relative to the power assembly. In addition, a portion of the power assembly is designed to allow limited universal motion of the elongated linking means about an axis normal to the longitudinal axis of the linking means.

9 Claims, 4 Drawing Figures

COMPENSATING LINKAGE

CROSS-REFERENCE TO RELATED APPLICATION

This application is a division of my copending application Ser. No. 815,989, now issued as U. S. Pat. No. 3,570,605 on Mar. 16, 1971.

BACKGROUND OF THE INVENTION

One of the more common types of farm implements currently in use is the grain drill which, as generally constructed, includes a pair of aligned disk gangs which may be raised or lowered by a power mechanism, such as a power cylinder. For this purpose a linkage mechanism is commonly provided to interconnect each of the disk gangs with the power mechanism and with each other.

When such grain drills are used on relatively flat land surfaces no problems are encountered insofar as the linked motion of the two disk gangs is concerned. When, however, relatively high or low portions of the land are encountered by one of the disk gangs but not the other there is a tendency of the gangs to move as a unit upwardly or downwardly to accommodate to the change in elevation of the ground beneath one of the gangs. When this occurs the depth of the furrows being made by the disk gang which does not encounter the surface irregularity is either decreased or increased due to the response of the disk gang to the motion of the other gang, which response occurs due to the interconnecting linkage. As this occurs the depth of planting becomes nonuniform with a resultant decrease in production of the land being planted.

This problem has been recognized and to some extent alleviated by prior art mechanisms. Thus, it is not uncommon to find incorporated into disk drills a pair of manually operated levers which independently raise or lower one or the other of the disk gangs. This type of apparatus has been found useful when there is a uniform difference in elevation of the land surface which is encountered by the grain drill, such as on hillsides and the like. However, because it is necessary to manually move the compensating apparatus, such apparatus does not provide a practical means for overcoming the effect of relatively limited surface irregularties which might be encountered by one but not the other of the disk gangs while the drill operator is seated on the tractor.

Until the present invention a compensating linkage which is useful for raising the lowering a pair of aligned disk gangs while at the same time allowing relative vertical motion of the disk gangs in response to limited irregularties on the land surface has remained an elusive desideratum.

DESCRIPTION OF THE DRAWINGS

Apparatus embodying one form of the present invention is disclosed in the following written description which is to be read in conjunction with the accompanying drawings wherein like reference characters designate like parts in all views and wherein.

GENERAL DESCRIPTION OF THE APPARATUS

Figure 1:
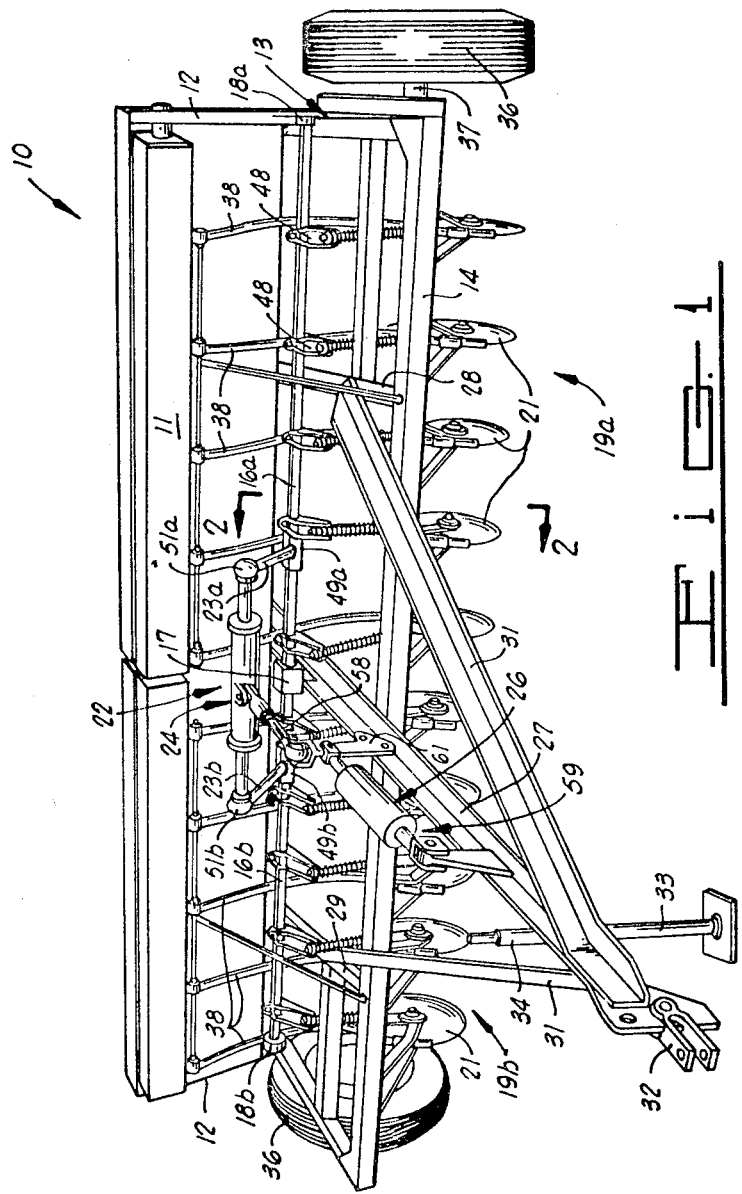
FIG. 1 is a generalized perspective view of a grain drill having mounted thereon a compensating linkage which embodies the present invention.

Turning now to the drawings and in particular to FIG. 1, there is shown a grain drill indicated generally by the numeral 10 which includes a grain box 11 of standard design mounted by means of upright braces 12 on a frame 13 containing a frontal cross beam 14. Near the central portion of grain drill 10 are a pair of axially aligned, rotatable adjusting shafts 16a and 16b which are journaled for rotation at their proximate ends in a common journal box 17. The outer ends of the shafts are likewise rotatably journaled into journal fittings 18a and 18b, respectively, which are carried on upright braces 12.

A pair of disk gang assemblies indicated generally by the numerals 19a and 19b are in operative engagement with adjusting shafts 16a and 16b, respectively, in a manner to be hereinafter described, whereby the individual disks 21 of the disk gangs may be moved in a substantially vertical direction by incremental rotation of the adjusting shafts.

Rotation to the adjusting shafts, with resulting vertical displacement of the disk gang assemblies, is imparted by a compensating linkage assembly indicated generally by the numeral 22 which includes, among other elements, a pair of arms 23a and 23b rigidly secured to adjusting shafts 16a and 16b, respectively. Also included within the compensating linkage assembly is an elongated linking means 24 and a power assembly, indicated generally by the numeral 26, which is secured to a centrally located frame member 27. Power assembly 26 is in operative engagement with linking means 24 and serves to rotate the linking means and thus the adjusting shafts 16a and 16b in a limited arc to raise and lower gang assemblies 19a and 19b. Other features of compensating linkage assembly 22 which are described hereinafter are designed to allow relative rotation between adjusting shafts 16a and 16b while disk gangs 19a and 19b are in their lowered position whereby limited independent vertical motion of the disk gang assemblies is allowed.

DETAILED DESCRIPTION OF THE GRAIN DRILL

Figure 2:
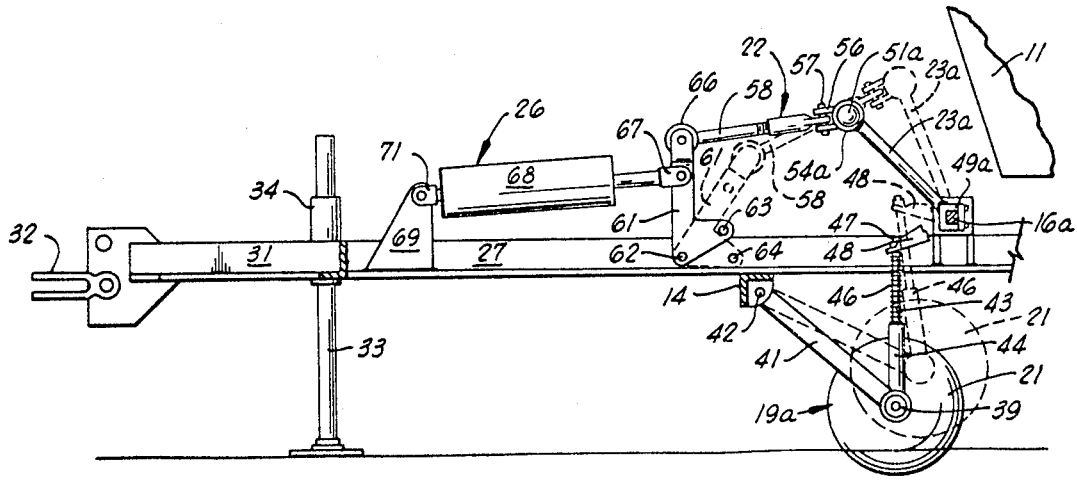
FIG. 2 is a fragmentary side view taken along line 2—2 of FIG. 1 with portions of the apparatus being omitted for clarity and showing two positions of a portion of the apparatus, one of such positions being shown in dotted outline.

In addition to the elements already described as comprising a portion of the grain drill are a pair of parallel horizontal braces 28 and 29 which form a portion of frame 13. A hitching yoke 31 projects outwardly from the front of grain drill 10 and is held rigidly thereto by a rigid connection between the inner portions of yoke 31 with braces 28 and 29. Additional rigidity is afforded the hitching yoke by the rigid engagement of the yoke with a portion of frame member 27, at the end of which is located a tractor hitch 32. As best shown in FIG. 2, a hitch stand 33 which serves to maintain hitching yoke 31 in a more-or-less horizontal position when the grain drill is stored is secured to frame member 27 by means of a mounting sleeve 34. Means, not shown, are provided for maintaining stand 33 in an upward position during the period of time in which the grain drill is being operated.

A pair of pneumatic tires 36 are located at either end of grain drill 10 and are attached to frame 13 by means of stub shafts 37. As the grain drill moves across the surface of the earth on tires 36, seed grain flows from grain box 11 down through a plurality of seed tubes 38 into proximity with the forward portion of disks 21.

As may be seen most clearly in FIG. 2, disk gang assemblies 19 include a plurality of disks 21 which are rotatably journaled on axles 39 carried at the end of pivot yokes 41. The ends of pivot yokes 41 opposite axles 39 are pivotally secured to the underside of cross beam 14 by means of pivot pins 42 whereby limited rotational motion of pivot yokes 41 around the cross beam may be provided when disks 21 are raised or lowered. Extending upwardly from and journaled on axles 39 are pressure rods 43 which function to push disks 21 downwardly and which include an enlarged lower portion 44. Pressure springs 46 abut the upper end of portions 44 of each of the pressure rods 43 and are held in compression thereon by means of a nut 47. A yoke-shaped member, herein identified as an elevating arm 48, is utilized to raise and lower each of the pressure rods 43 and is loosely secured to each of the pressure rods at a point between the upper end of pressure spring 46 and below nut 47. By this arrangement limited independent motion of adjacent disks is provided due to the compression of springs 46.

Arcuate motion which raises or lowers the disk gangs is provided to elevating arms 48 by the rotation of adjusting shafts 16a or 16b to which elevating arms 48 are rigidly secured, as best shown in FIG. 1. It may thus be seen when contemplating FIG. 2, that as adjusting shaft 16a is moved in a clockwise direction the elevating arms 48 secured thereon are likewise moved in a clockwise direction to raise each of the pressure rods 43 and with them the disks 21 to which they are secured. As the disks are thus raised, they are caused to pivot in an arc about cross beam 14 due to the presence of pivot yoke 41.

DETAILED DESCRIPTION OF THE COMPENSATING LINKAGE ASSEMBLY

Conpensating linkage assembly 22 functions to rotate adjusting shafts 16a and 16b, and to this end arms 23a and 23b are rigidly secured to shafts 16a and 16b, respectively, by box couplings indicated generally by the numerals 49a and 49b, respectively. The upper ends of arms 23a and 23b are in turn secured to the outer ends of linking means 24 by ball joints 51a and 51b, respectively, whereby limited universal motion between the arms 23 and linking means 24 is provided whenever one of the adjusting shafts 16 is rotated relative to the other of the shafts.

Figure 3:
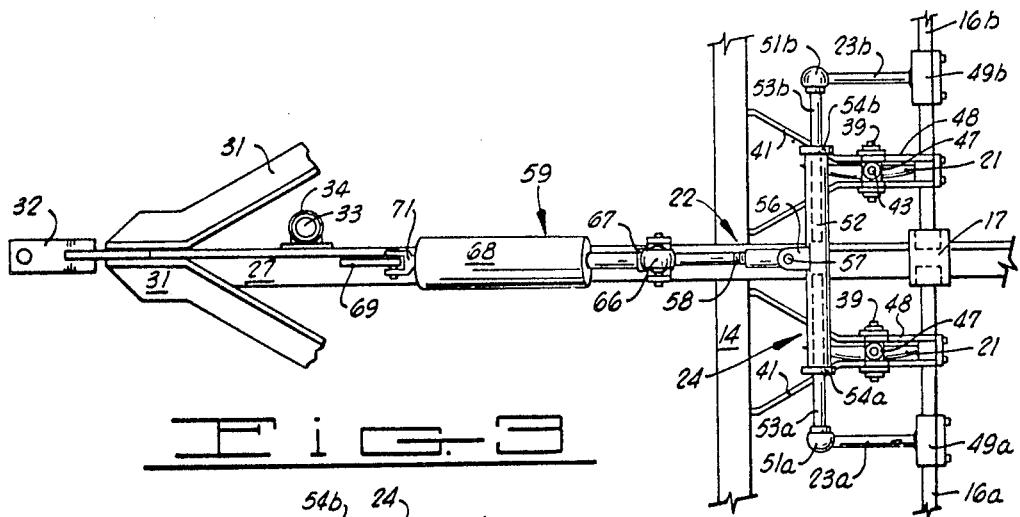
FIG. 3 is a plan view showing the relationship of a power assembly with other elements of the compensating linkage and of the grain drill.

As best seen in FIG. 3, linking means 24 comprises a cylindrical member 52 in which are slidably disposed a pair of rods 53a and 53b on which are carried flanges 54a and 54b, respectively, for limiting the motion of rods 53 into the interior of cylindrical member 52. Ball joints 51a and 51b which are connected to arms 23a and 23b, respectively, are located upon and integral with rods 53a and 53b, respectively. A clevis assembly 56 is mounted on the central, frontal portion of cylindrical member 52 and includes a pivot pin 57 oriented in a direction normal to the horizontal plane passing through the longitudinal axis of linking means 24.

Power assembly 26 includes a push rod 58, the rearward end of which is secured to cylindrical member 52 by means of clevis assembly 56 whereby relative motion between the push rod and the cylindrical member in a horizontal plane including the longitudial axis of the cylindrical member is allowed. Power means, indicated generally by the numeral 59, also comprise an element of power assembly 26 and include a bell crank 61 which is pivotally secured on frame member 27 by a pivot pin 62. An aperture 63, formed in a rearward portion of bell crank 61, indexes with a similar aperture 64 located in frame member 27 when bell crank 61 is moved into its extreme clockwise position as shown in dotted line in FIG. 2. A pin, not shown, may be inserted into the thus aligned apertures to maintain disk gang assemblies 19a and 19b in a raised, road position when the disk gangs are not in use. The upper end of bell crank 61 carries a ball joint 66 to which is secured the forward end of push rod 58 whereby limited universal motion between the push rod and the bell crank is allowed when cylindrical member 52 is displaced due to the relative rotation between adjusting shafts 16a and 16b. At a point on bell crank 61 subjacent ball joint 66 is secured a clevis 67 carried by a hydraulic piston assembly 68 acting thereon. Reaction support for the motion of piston assembly 68 is obtained from an upright piston mount 69 on which the piston is secured by means of a clevis 71.

OPERATION

The operation of the present device may best be understood by assuming that disk gang assemblies 19a and 19b are initially in their upward, road position as shown in dotted lines in FIG. 2. Under these conditions, hydraulic piston assembly 68 is in its extended position and bell crank 61 has been moved thereby into its extreme clockwise position to thrust linking means 24 to the right thereby rotating adjusting shafts 16a and 16b in a clockwise position. When operations are begun on level ground, hydraulic piston assembly 68 is actuated to rotate bell crank 61 counterclockwise into its full line position, as shown in FIG. 2, thereby moving push rod 58 to the left. As this occurs, linking means 24 is moved by push rod 58 to the left and downwardly whereupon adjusting shafts 16a and 16b are moved counterclockwise by the action of arms 23a and 23b acting from linking means 24 through ball joints 51a and 51b, respectively. As the adjusting shafts are thus moved, they rotate arms 48 counterclockwise and downwardly. Since a pressure rod 43 is secured to the outer end of each of the elevating arms, the pressure rods are likewise moved downwardly whereupon their associated disks 21 are pivoted downwardly in a clockwise direction at the end of pivot yokes 41. In this position the grain drill may be moved across the surface of the earth with a seed furrow being opened by each of the disks 21 and seeds from seed tubes 38 being deposited therein.

Figure 4:
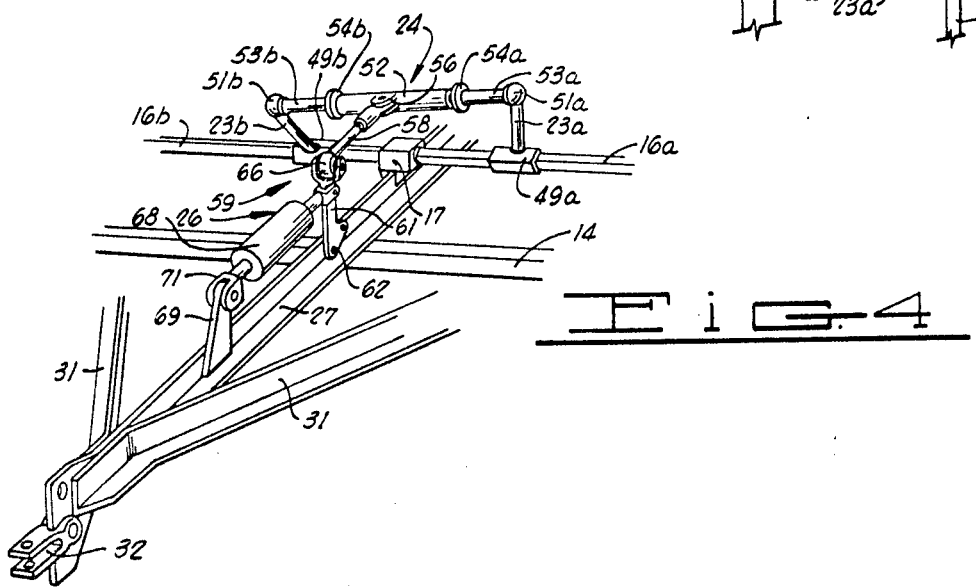
FIG. 4 is a fragmentary perspective view of the compensating linkage shown in FIGS. 2 and 3 wherein a portion of the linkage is displaced to demonstrate the manner in which the linkage moves when a limited surface irregularity is encountered by one of the disk gangs on the grain drill.

The compensating features of the described apparatus come into play whenever one, but not the other, of disk gang assemblies 19 encounters a limited anomaly in the surface of the earth. For purposes of example, let it be assumed that disk gang assembly 19a encounters an elevation on the ground. When this occurs, disks 21 associated with gang assembly 19a tend to raise, thereby lifting pressure rods 43 and rotating the elevating arms associated with the pressure rods in a clockwise direction. Upon such clockwise rotation of the elevating arms 48, adjusting shaft 16a is likewise moved in a clockwise direction due to the rigid interconnection of elevating arms 48 with the shaft. Since arm 23a is integral with shaft 16a it also moves into a clockwise arc, thus elevating ball joint 51a, as shown in FIG. 4. As ball joint 51a is moved upwardly, rod 53a is withdrawn a slight distance from the interior of cylindrical member 52, as shown in FIG. 4. Simultaneously, cylindrical member 52 is canted around push rod 58 in the direction shown. Such canting is made possible by the universal connection between push rod 58 and power means 59 at ball joint 66.

As the described motion takes place in the "a" (i.e. right hand) portion of the assembly, there will, of course, be a tendency for disk gang assembly 10b to be moved downwardly by the linkage thereby forming a deeper furrow. Such a tendency will, or course, be reduced in relatively hard soil; and, if the soil is sufficiently firm, may be overcome all together since the action of ball joint 51b in combination with ball joint 66 allows limited elevation of the "a" end of linking means 24 without a corresponding movement of rod 23b.

At such time as the surface irregularity encountered by disk gang assembly 19a is passed, the sequence outlined immediately above is reversed by the lowering of disk gang assembly 19a which results in a counterclockwise motion of adjusting shaft 16a thereby returning linking means 24 to a horizontal position, as shown in full line in FIG. 3. It will, of course, be understood that similar motions of the compensating linkage assembly take place when disk gang 19b encounters an elevation which is not encountered by disk gang 19a. Moreover, similar, but opposite, motions will occur when one or the other of the disk gangs falls into a depression.

When it is desired to move the grain drill from one location to another, hydraulic piston assembly 68 is actuated to move bell crank 61 in a clockwise direction thereby elevating the disk gangs in an obvious manner.

From the above description it may be seen that the present invention provides means for conveniently and easily raising and lowering a pair of disk gang assemblies simultaneously and also provides an automatic compensating motion for allowing independent vertical movement of one of the disk gangs relative to the other when such disk gang encounters a vertical irregularity on the surface of the earth.

It should be understood that the embodiment described herein is presented by way of example only and that many changes thereto can be made without departing from the spirit of the invention or the scope of the annexed claims.

What is claimed is:

1. A compensating linkage interconnecting a pair of aligned, rotatable shafts mounted on a frame which comprises:
    a. an elongated linking means;
    b. a universal joint carried at each end of said linking means;
    c. an arm secured to each of said universal joints;
    d. means for rigidly securing a first of said arms to a first of said shafts;
    e. means for rigidly securing the second of said arms to the second of said shafts; and
    f. a power assembly mounted on said frame for moving the elongated linking means in an arc about a portion of said shafts, said assembly being in operative engagement with the linking means at a point thereon intermediate the ends thereof.

2. The apparatus defined in claim 1 wherein said power assembly comprises:
    a. a push rod;
    b. means for connecting the push rod to the linking means to allow relative motion of a portion of the push rod toward and away from the ends of the elongated linking means;
    c. power means mounted on said frame; and
    d. a ball joint operatively connecting said power means and said push rod whereby the push rod and the linking means connected thereto may be moved relative to said power means.

3. The apparatus defined in claim 2 wherein said power means comprises:
    a. a hydraulic piston; and
    b. a bell crank pivotally connected to said frame and secured to said hydraulic piston, the ball joint being secured at the outer end of said bell crank.

4. The apparatus defined in claim 2 wherein the means for connecting the push rod and the linking means comprises a clevis having a pivot pin associated therewith, which pin extends normal to the plane which includes the longitudinal axes of the push rod and of the linking means.

5. The apparatus defined in claim 1 wherein the linking means comprises:
    a. an elongated cylinder;
    b. a first rod slidably received within the interior of said cylinder and projecting therefrom from the first end thereof;
    c. a second rod slidably received within the interior of said cylinder and projecting therefrom from the second end thereof; and
    d. one of the universal joints carried by the linking means being secured at the end of said first rod opposite said cylinder and the other of said universal joints being secured at the end of the second rod opposite said cylinder.

6. The apparatus defined in claim 5 wherein said power assembly comprises:
    a. a push rod;
    b. means for connecting the push rod to the linking means to allow relative motion of a portion of the push rod toward and away from the ends of the elongated linking means;
    c. power means adapted for mounting on said frame; and
    d. a ball joint operatively connecting said power means and said push rod whereby the push rod and the linking means connected thereto may be moved relative to said power means.

7. The apparatus defined in claim 6 wherein said power means comprises:
    a. a hydraulic piston; and
    b. a bell crank pivotally secured on said frame and to said hydraulic piston, the ball joint being secured at the outer end of said bell crank.

8. The apparatus defined in claim 7 wherein the means for connecting the push rod and the linking means comprises a clevis having a pivot pin associated therewith, which pin extends normal to the plane which includes the longitudinal axes of the push rod and of the linking means.

9. The apparatus defined in claim 8 wherein the means for pivotally securing the bell crank to the hydraulic piston comprises a clevis having associated therewith a pivot pin which extends normal to the plane of motion of the bell crank as the bell crank pivots on said frame.

* * * * *